2,766,662

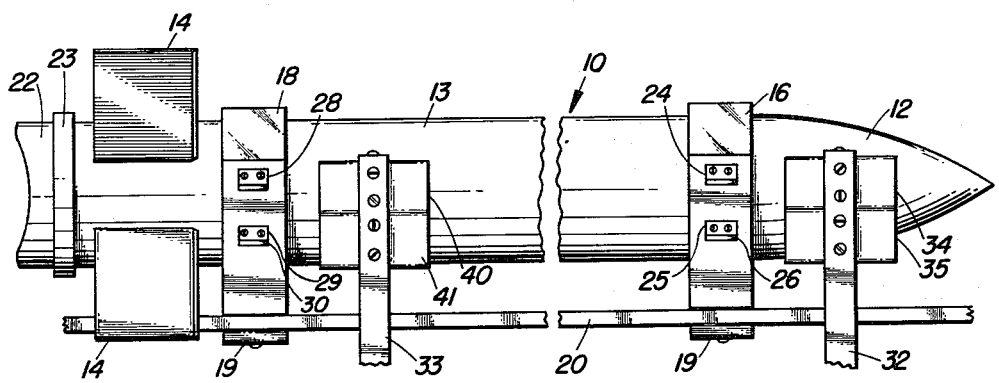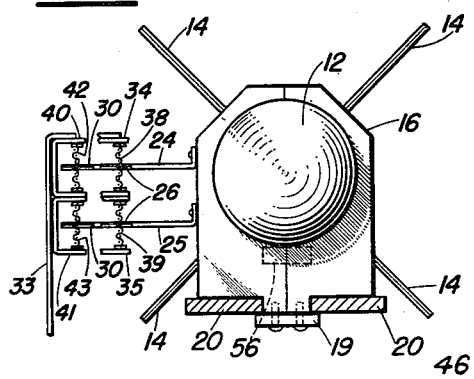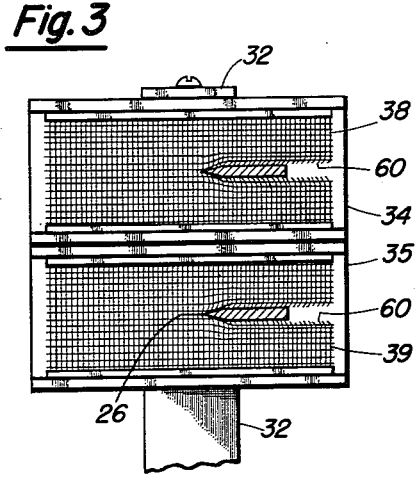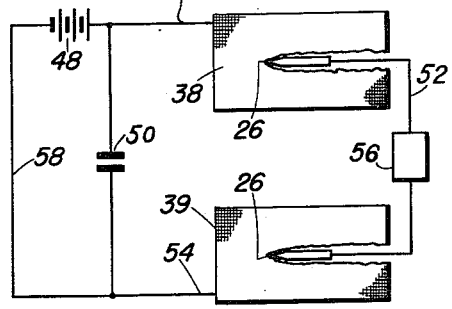
INVENTOR.
Clarence E. Weinland
Roderick M. McClung
Stanley J. Marcus
BY
Attorneys

ROCKET WITH ELECTRICAL CONTACT OF WIRE SCREEN

Stanley J. Marcus, Roderick M. McClung, and Clarence E. Weinland, China Lake, Calif.

Application July 24, 1952, Serial No. 300,792

5 Claims. (Cl. 89—1.7)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for electrically initiating the propellant charge or other mechanism of a rocket or other device while the same is in rapid motion.

By way of illustration, the invention is described herein as applied to rocket mechanism, but it will be understood that it is applicable to other types of rapidly moving mechanisms wherein it is desired to complete an electrical circuit at a predetermined instant.

In the launching of a rocket, it is known to mount the rocket on a carriage which is moved rapidly along a horizontal track by means external to the rocket, such as an auxiliary rocket, and to initiate the combustion of the propellant charge by means of a circuit maker comprising a stationary striker mounted at the desired point along the track and operative to close a switch on the carriage. The electrical circuit thus completed may include a contact shoe on the carriage making contact with a third rail, and may be caused to actuate an igniter or squib within the rocket, or to perform other desired functions.

At carriage speeds in excess of 700 or 800 feet per second, malfunctioning of the circuit maker often occurs. In some cases, the contact shoe fails to maintain adequate contact with the third rail because of wear, track malalignment, or other cause. In other cases, the switch is tripped prematurely by the vibration of the carriage.

It is an object of the present invention to provide ignition mechanism suitable for carriage speeds of 1500 feet per second or higher, and which will avoid the difficulties above stated, by providing contact elements of minimum weight, yet capable of maintaining good contact during an interval long enough to insure initiation of the charge.

Other objects and many of the attendant advantages of this invention will be readily appreciated as the same becomes better understood by reference to the following description.

Fig. 1 is a view in longitudinal elevation of a rocket mechanism embodying the invention;

Fig. 2 is an enlarged end view of the same;

Fig. 3 is an enlarged view in elevation of the contact elements in operation; and Fig. 4 is a wiring diagram of the electrical circuit.

The apparatus shown in the drawing comprises a rocket 10 having a head 12, a motor 13, and control surfaces or fins 14. The rocket is mounted on a carriage which includes a forward skid 16 and a rear skid 18 each formed in two mating sections and held together by any suitable means including a plate 19. The skids are slidable on spaced rails 20 which form a launching track which may be either horizontal, as shown, or inclined to form a ramp. The carriage is propelled by any suitable means such as a booster rocket indicated at 22, separably secured to the aft end of rocket 10 by a clamp 23.

Secured to and projecting laterally from the forward skid 16 are two metal arms 24, 25 having their outer ends formed with forwardly directed knife blades 26. A similar pair of arms 28, 29 are secured to and project from the rear skid 18, but are longer than the arms 24, so that their knife blades 30 extend beyond the outer ends of blades 26. Mounted at spaced points alongside the rails 20 are two standards 32, 33. The standard 32 supports two brackets 34, 35 disposed one above the other and suspending by any suitable means upper and lower vertical foils 38, 39. As used herein, the term "foil" includes metal screen, and it is this form of "foil" which is shown in the drawings. In practice, a copper plated wire mesh screen has been used with good results. The standard 33 is spaced somewhat further from the rails than standard 32 and supports two brackets 40, 41 disposed one above the other and suspending upper and lower foils 42, 43. As indicated in Fig. 2, the forward foils 38, 39 are disposed in the paths of the knives 26 of the forward skid, while the rear foils 42, 43 are disposed in the paths of the knives 30 of the rear skid.

As shown in the circuit diagram of Fig. 4, the two forward foils 38 and 39 are connected to battery 48 by wires 46, 54, and 58. Numeral 50 indicates a condenser connected across battery 48. The two forward knives 26 are electrically connected, the connection being formed by wire 52 including therein the igniter, or other initiating device 56. The circuit through device 56 is completed as shown when knives 26 cut through foils 38 and 39. Condenser 50 is normally charged by the battery 48 and when the circuit is completed through the foils it quickly discharges through device 56. The device 56 may be a squib for igniting the propellant of rocket 10 to cause it to become self-propelled at a predetermined point in its movement, but it is indicated in Fig. 2 as being an explosive bolt or stud which forms a retaining element holding the two halves of skid 16 together until its explosive charge is initiated, whereupon it serves to move the two halves of the skid away from each other and from the rocket, to jettison the skid after the rocket has been launched. A similar electrical circuit, not shown, may be used with the knives and screens associated with the rear skid 18.

In the operation of the device, the rocket 10 is propelled along the rails on its skids until at a predetermined point in its path the blades 26 are brought into cutting relation to the foils 38, 39. As the blades move through the foils, inertia causes the severed edges 60 of the foils to bear with appreciable force against the opposite faces of the knives, producing an excellent electrical contact which is maintained for such length of time as is required for the knives to move the length of the foils. Condenser 50 discharges through lead or wire 46, foil 38, upper knife 26, lead 52, device 56, lower knife 26, foil 39 and lead or wire 54. In the form of invention shown in the drawings, the knives 30 of the rear skid simultaneously pass through the foils 42, 43 of the rear brackets, but this arrangement may be varied to complete the two circuits in sequence if desired.

Because of the light weight of the foil 38, shock or impact between the moving and stationary elements of the apparatus is minimized, thereby minimizing danger of premature detonation of any fuses or other explosives carried by the rocket.

The device has been successfully used at track velocities in excess of 2500 feet per second. By the use of the apparatus herein disclosed high currents may be transmitted with very little voltage loss and without chattering during the contact time.

The invention may also be applied to other types of missiles or vehicles. If desired, the foils may be mounted on the rocket and the blades on a stationary support.

Obviously many modifications and variations of the present invention are possible in the light of the above teachings. It is therefore to be understood that within the scope of the appended claims the invention may be practiced otherwise than as specifically described.

What is claimed is:

1. In combination, a body, means external to the body for propelling it at high speed along a predetermined path, a combustible associated with the body, an electrical circuit operative to initiate said combustible, and a contactor in said circuit comprising a stationary conducting foil positioned at a predetermined point along the path of said body and a conductive cutting blade carried by the body operative to cut the foil thereby completing the circuit.

2. In combination, a body, a skid supporting said body, means for moving said body and skid through a predetermined path, an explosive positioned to separate the skid from the body, an electrical circuit operative to initiate said explosive, and a contactor in said circuit comprising a stationary conducting foil at a predetermined point along said path and a conductive cutting blade carried by the skid operative to cut the foil thereby completing the circuit.

3. In combination, a rocket having a propellant, a skid supporting said rocket for movement along a track a booster for moving the rocket and skid along said track, an explosive charge for separating the skid from said rocket to permit jettison of said skid after the rocket is launched, an electrical circuit operative to initiate said explosive charge and igniting the propellant of said rocket, and a contactor in said circuit comprising a conducting foil and a conductive cutting blade, one of said contactor elements being carried by the rocket and the other of said contactor elements being mounted in the path of said first element, whereby when said rocket is moved along the track on said skid said cutting blade will be brought into cutting relation with said foil at a predetermined point and as said cutting blade moves through the foil inertia will cause the severed edges of said foil to bear against opposite faces of said cutting blade with appreciable force making an excellent electrical contact and completing said electrical circuit for the time required for the cutting blade to move the length of said foil.

4. The invention defined in claim 3, wherein the foil element is a sheet of wire screen.

5. In combination, a body including a rocket having a propellant and a skid supporting the rocket for movement along a track, means for moving said body along said track at high speed, an explosive carried by said body for separating said skid from said rocket, an electrical circuit operative to initiate said explosive and to ignite said rocket propellant, and a plurality of contactors in said circuit each comprising a conducting foil and a conductive cutting blade, one carried by the body and the other stationary in the path of said one to cause said foils to be cut by said cutting blades at a predetermined point on the track when said body is moved along said track thereby completing said electrical circuit while said foils are being cut.

References Cited in the file of this patent

UNITED STATES PATENTS

| | | |
|---|---|---|
| 1,771,258 | Kalikow et al. | July 22, 1930 |
| 1,824,663 | Munbrun | Sept. 22, 1931 |
| 1,897,863 | Ruhlemann | Feb. 14, 1933 |
| 1,917,814 | Ruhlemann | July 11, 1933 |
| 2,317,238 | Mennecier | Apr. 20, 1943 |
| 2,487,187 | Seifried et al. | Nov. 8, 1949 |
| 2,494,802 | Fox | Jan. 17, 1950 |
| 2,496,316 | Skinner et al. | Feb. 7, 1950 |

FOREIGN PATENTS

| | | |
|---|---|---|
| 624,582 | Great Britain | June 13, 1949 |